Figure 3:
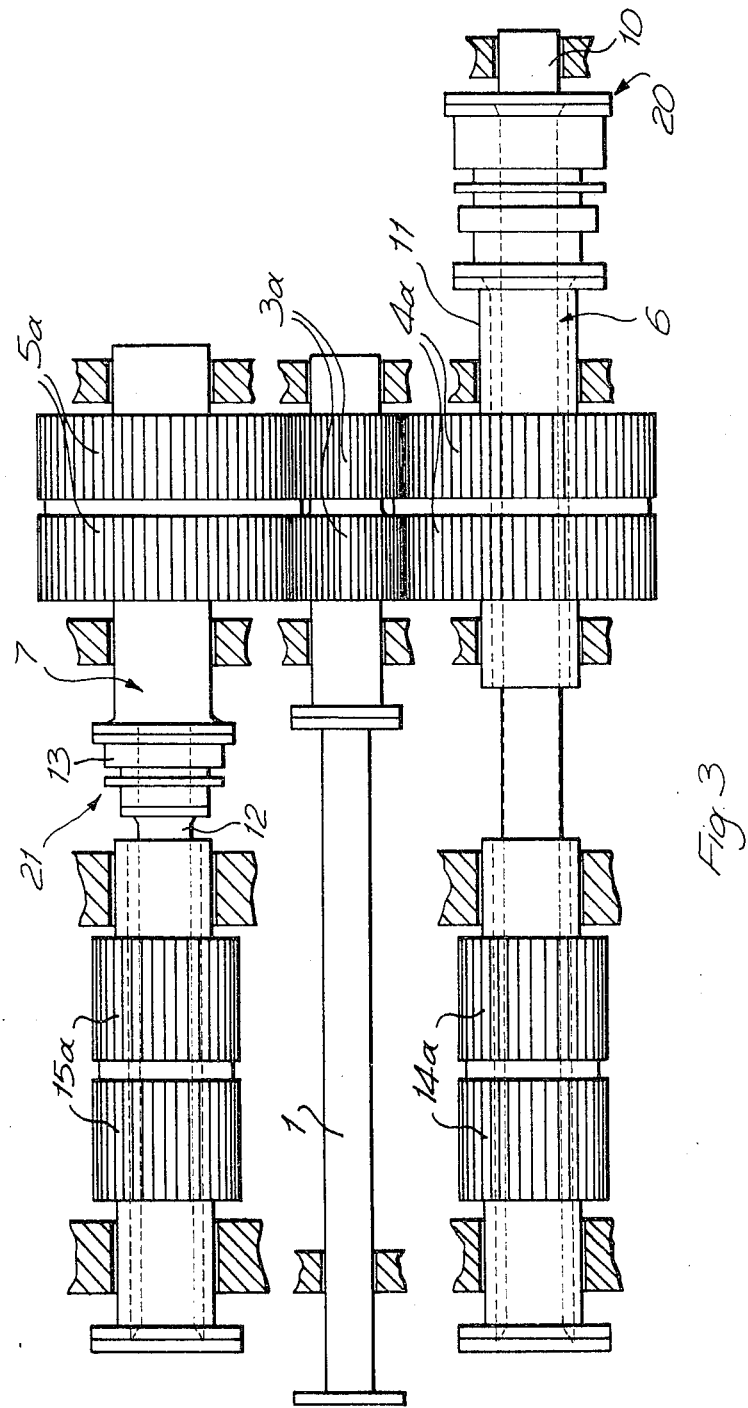

United States Patent [19]

Clements

[11] 4,250,985
[45] Feb. 17, 1981

[54] POWER TRANSMISSION SYSTEM

[75] Inventor: Herbert A. Clements, Woking, England

[73] Assignee: S.S.S. Patents Limited, Sunbury-on-Thames, England

[21] Appl. No.: 965,333

[22] Filed: Dec. 1, 1978

[30] Foreign Application Priority Data

Dec. 23, 1977 [GB] United Kingdom ............... 53681/77

[51] Int. Cl.³ ....................... F16D 23/10; F16D 21/00
[52] U.S. Cl. ..................................... 192/48.7; 74/339; 74/665 P; 192/67 A
[58] Field of Search ............... 192/48.7, 67 A; 74/339, 74/665 P

[56] References Cited

U.S. PATENT DOCUMENTS 3,326,056  6/1967  Clements et al. ............... 192/48.7 X
3,620,336  11/1971  Clements ....................... 192/67 A X Primary Examiner—Allan D. Herrmann
Attorney, Agent, or Firm—Woodcock, Washburn, Kurtz, Mackiewicz & Norris

[57] ABSTRACT

A power transmission system comprises a synchronous main toothed clutch 20 and a subsidiary toothed clutch 21 arranged in parallel in main and subsidiary power paths 6, 7 respectively between an input shaft 1 and an output shaft 2. When the main clutch 20 is engaged this causes engagement of the subsidiary clutch 21. The main power path 6 has a torsional stiffness which is substantially less than that of the subsidiary power path 7 over at least an initial part of the range of torque loading between zero and full power, such that at full power or at a pre-determined proportion of full power the main power path 6 and the subsidiary power path 7 transmit substantially the same load.

9 Claims, 3 Drawing Figures

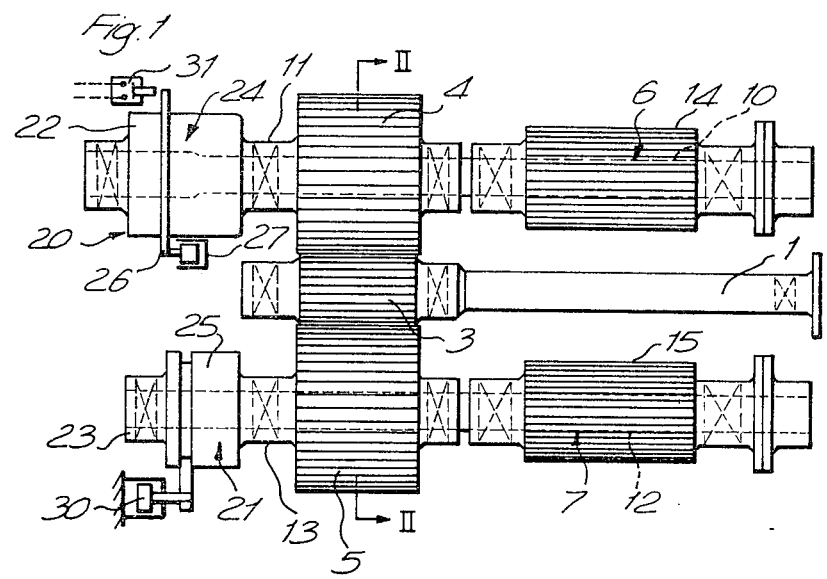
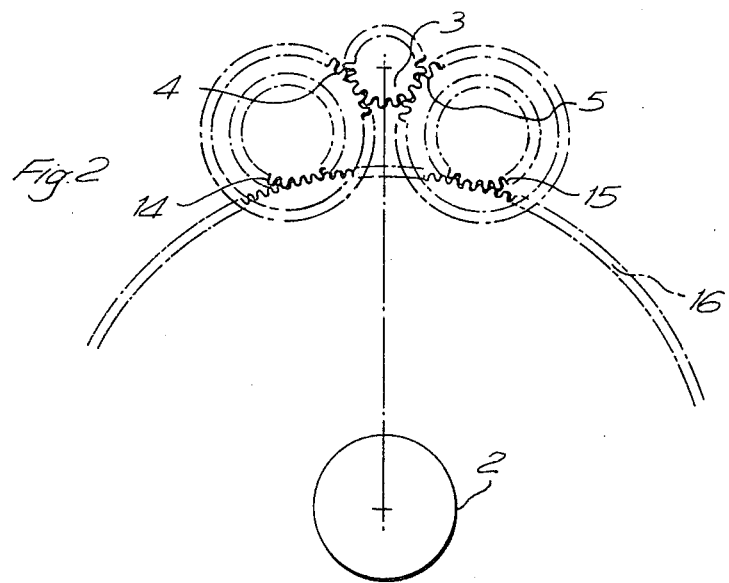

POWER TRANSMISSION SYSTEM

This invention relates to a power transmission system.

In our British Patent Specification No. 1,296,374 there is disclosed a power transmission system having a main power path and at least one subsidiary power path between an input shaft of the system and the output shaft of the system, the load being shared equally between the various power paths. In the main power path there is a synchronous main toothed clutch, and in each of the subsidiary power paths there is a subsidiary toothed clutch which is arranged to be engaged by means of a linkage which is moved by the main clutch when the latter is moved into engagement. However, if the clutches are required to engage at a high relative rate of acceleration, this linkage may be subjected to very high forces. The linkage therefore needs to be designed with great care to ensure that the deflections which take place during engagement are not excessive since any excessive deflections would affect the correct phasing of the or each subsidiary clutch.

The object of the present invention, therefore, is to provide a power transmission system in which the load is shared between the main and subsidiary power paths either without the use of such a linkage or, if such a linkage is employed, without the linkage being subjected to the very high forces referred to above, and without its design being critical.

According therefore to the present invention, there is provided a power transmission system comprising a synchronous main toothed clutch and at least one subsidiary toothed clutch, said main and subsidiary clutches being arranged in parallel in main and subsidiary power paths respectively between an input shaft of the system and an output shaft of the system, actuating means controlled by the main clutch for effecting interengagement with clearance of the co-acting clutch teeth of the or each subsidiary clutch, said actuating means being rendered operative after engagement of the main clutch has commenced, the main power path having a torsional stiffness which is substantially less than that of the or each subsidiary power path over at least an initial part of the range of torque loading between zero and full power, such that at full power or at a predetermined proportion of full power the main power path and the or each subsidiary power transmits substantially the same load.

In one form of the present invention, the torsional stiffness of the main power path is substantially less than that of the or each subsidiary power path at all torque loadings below full power.

Alternatively, the torsional stiffness of the main power path may be substantially less than that of the or each subsidiary power path duhring the said initial part only of the said range, the torsional stiffness of the main power path and of the or each subsidiary power path being substantially equal throughout the remaining part of the said range.

Each said power path may comprise a quill shaft, the quill shaft of the main power path having a diameter less than and/or having an axial length greater than that of the quill shaft of the or each subsidiary power path.

Alternatively, the main power path may include a torsionally flexible coupling and there may, if desired, by means for limiting the deflection of the torsionally flexible coupling. Thus the means for limiting the deflection of the torsionally flexible coupling may come into effect when the power transmission system is operating at the said predetermined proportion of full power.

The main clutch is preferably a synchronous self-shifting clutch.

The said main clutch may comprise a first rotary clutch part having clutch teeth, a second rotary clutch part and an intermediate member having clutch teeth and arranged for movement relative to one of said first and second clutch parts to bring its clutch teeth into and out of driving engagement with the clutch teeth of said first clutch part, such that following partial driving interengagement of the coacting clutch teeth the main clutch is self-engaging, due to the interaction of the clutch teeth, said main clutch having a pawl and ratchet or equivalent mechanism for automatically initiating movement of its intermediate member in the direction for clutch engagement upon passage of the input and output part of the main clutch through rotational synchronism due to relative rotation of said input and output shafts in one direction.

Preferably, the or each said subsidiary clutch is engaged immediately there is full engagement of the main clutch at the said rotational synchronism.

Preferably the said actuating means comprises a servo-operated locking means which is movable into and out of a locking position in which it maintains the main clutch in the engaged condition.

Preferably the or each subsidiary clutch may comprise a first rotary part having straight clutch teeth the number of which is the same as the number of clutch teeth of the main clutch, a second rotary clutch part, and an intermediate member having clutch teeth and arranged for axial movement relative to the first and/or second clutch part to bring the clutch teeth of the first clutch part and of the intermediate member into and out of driving engagement.

The or each subsidiary shaft may be provided with a servo mechanism for effecting movement of its intermediate member in the direction for clutch engagement, the or each servo mechanism being operated whenever the said locking means is moved towards or into the locking position.

The invention is illustrated, merely by way of example, in the accompanying drawings, in which:

FIG. 1 is a diagrammatic plan view of a first embodiment of a power transmission system according to the present invention, FIG. 2 is a diagrammatic sectional view taken on the line II—II of FIG. 1, and FIG. 3 is a diagrammatic plan view of a second embodiment of a power transmission system according to the present invention.

Referring to FIGS. 1 and 2, a first embodiment of a power transmission system according to the present invention, which may for example form part of a marine reverse reduction gearbox, comprises an input shaft 1 which is arranged to be driven by a turbine (not shown), and an output or propellor shaft 2. The input shaft 1 is provided adjacent one end thereof with a reduction gear pinion 3 which is disposed between and in mesh with gear wheels 4, 5 on layshafts 6, 7 respectively, the layshafts 6, 7 constituting main and subsidiary power paths respectively between the input shaft 1 and the output shaft 2.

The main power path 6 comprises a sleeve shaft 11 which is provided with the gear wheel 4, a quill shaft 10 passing through the sleeve shaft 11. Similarly, the subsidiary power path 7 comprises a sleeve shaft 13 which is provided with the gear wheel 5, a quill shaft 12 passing through the sleeve shaft 13.

Rigidly secured to the quill shafts 10, 12 are reduction pinions 14, 15, respectively, each of the reduction pinions 14, 15 meshing with a gear wheel 16 which is mounted on the output shaft 2.

A main toothed clutch 20 is provided which, when engaged, transmits drive from the sleeve shaft 11 to the quill shaft 10, while a subsidiary toothed clutch 21 is provided which, when engaged, transmits drive from the sleeve shaft 13 to the quill shaft 12. The main clutch 20 is a synchronous self-shifting clutch, whereas the subsidiary clutch 21 is a straight tooth clutch and not a self-shifting clutch.

The clutches 20, 21 have first rotary clutch parts 24, 25 respectively each having the same number of clutch teeth (not shown), and second rotary clutch parts 22, 23 respectively. The clutches 20, 21 also have intermediate members (not shown) having clutch teeth and arranged for movement relative to one of the said first and second clutch parts to bring its clutch teeth into and out of driving engagement with the clutch teeth of the first rotary clutch part 24, 25.

The main clutch 20 has helical sliding splines such that, following partial driving inter-engagement of the co-acting clutch teeth, the clutch is self-engaging due to the inter-action of the clutch teeth. The main clutch 20 also has a pawl and ratchet or equivalent mechanism (not shown) for automatically initiating movement of its intermediate member in the direction for clutch engagement upon passage of the input and output parts of the main clutch through rotational synchronism due to relative rotation of the input shaft 1 and output shaft 2 in one direction. Moreover, the main clutch 20 is provided with a locking sleeve which may be as shown in our British Patent Specification No. 1,476,696 and which is provided with a flange 26. The locking sleeve is movable by a servo mechanism 27 into and out of a locking position in which it maintains the main clutch 20 in the engaged condition.

The subsidiary clutch 21 is a servo-operated clutch whose first rotary clutch part 25 has straight clutch teeth. The subsidiary clutch 21 is not self-engaging since it is not provided with the said pawl and ratchet or equivalent mechanism for automatically initiating movement of its intermediate member in the direction for clutch engagement. The co-acting clutch teeth of the subsidiary clutch 21 are, however, inter-engaged with clearance by the operation of a servo mechanism 30. The servo mechanism 30 is controlled by a control device which includes a normally open micro-switch 31 which is closed by the flange 26 of the locking sleeve whenever the latter is moved towards or into the locking position. Thus when the locking sleeve is moved towards or into the locking position, the servo mechanism 30 effects movement of the intermediate member (not shown) of the subsidiary clutch 21 in the direction for clutch engagement. Accordingly, in operation, the main clutch 20 will automatically engage at synchronism and the arrangement can be such that, as soon as full engagement of the main clutch 20 takes place, the locking sleeve will move to the locked position and the servo mechanism 30 will then quickly bring the subsidiary clutch 21 into the engaged condition.

By reason of the manufacturing tolerances which must be provided on the various parts, it is necessary for there to be substantial clearance between the co-acting clutch teeth of the subsidiary clutch 21, and this means that the main clutch 20 will commence to transmit torque before the subsidiary clutch 21 transmits torque.

It will be appreciated that if the main and subsidiary power paths 6, 7 have equal torsional stiffness, the torque transmitted by the main clutch 20 when engaged will increase until such time as the teeth of the subsidiary clutch 21 move into flank contact. If the torque through the main clutch 20 to achieve toothed flank contact of the subsidiary clutch 21 is, say 5000 lbs. ft., this means that the main clutch 20 will always transmit 5000 lbs. ft. more than the subsidiary clutch 21. Consequently, if the full load torque transmitted by both clutches 20, 21 is, say 20,000 lbs. ft., the main clutch 20 will transmit 12,500 lbs. ft., and the subsidiary clutch 21 will transmit 7,500 lbs. ft.

In practice, the torque required to bring the clutch teeth of the subsidiary clutch 21 into contact may be considerably greater than the figures given above, particularly if these teeth are shifted into engagement with adequate clearance.

It is however important to ensure that the main power path 6 and the subsidiary power path 7 transmit substantially the same load when the driving power is at its maximum and this is achieved, in accordance with the present invention, by arranging that the main power path 6 has a torsional stiffness which is substantially less than that of the subsidiary power path 7 over at least an initial part of the range of torque loading between zero and full power so that at full power, or at a predetermined proportion of full power, the main power path 6 and the subsidiary power path 7 transmit substantially the same load. By reason of this arrangement, when the main clutch 20 engages in a comparatively low torque condition, the subsidiary clutch 21 will be shifted by the servo motor 30 into engagement with clearance and then, as the torque increases, the teeth of the subsidiary clutch 21 will move into flank contact whereby to transmit torque. At this instant, therefore, the main clutch 20 is transmitting the turbine reduced torque, and the subsidiary clutch 21 is transmitting no torque at all. However, as the turbine torque thereafter increases, the rate of increase in torque transmitted through the subsidiary clutch 21 will be greater than that transmitted through the main clutch 20, by reason of the fact that the main power path 6 has a torsional stiffness which is substantially less than that of the subsidiary power path 7. By appropriate design it may be arranged that, at substantially full power, or if desired at some predetermined proportion of full power such as half power, the load through each of the power paths 6, 7 is substantially equal.

In the power transmission system illustrated in FIGS. 1 and 2, the quill shaft 10 is shown as having a smaller diameter than the quill shaft 12, and, other things being equal this will ensure that the torsional stiffness of the main power path 6 is substantially less than that of the subsidiary power path 7 at all torque loadings below full power.

Alternatively, it could be arranged that the quill shafts 10, 12 did not differ in diameter but that the quill shaft 10 incorporated at one end a torsionally flexible coupling (not shown), means (not shown) (e.g. end stops) being provided for limiting the deflection of the torsionally flexible coupling. Thus it could be arranged that the means for limiting the deflection of the torsionally flexible coupling should come into effect at, say, half turbine power. In such an arrangement, the torsional stiffness of the main power path 6 is substantially less than that of the subsidiary power path 7 over the initial part of the range of torque loading between zero and full power, e.g. up to half power, while the torsional stiffness of the main power path 6 and subsidiary power path 7 are substantially equal throughout the remaining parts of the said range, i.e. from half power to full power. This is so because, one half power has been achieved, further deflection of the torsionally flexible coupling is prevented and consequentially thereafter, both power paths transmit equal torque.

In FIG. 3 there is shown a diagrammatic plan view of a second embodiment of a power transmission system according to the present invention. The system shown in FIG. 3 is generally similar to that shown in FIGS. 1 and 2 and for this reason will not be described in detail, like reference numerals indicating like parts.

In the embodiment of FIG. 3, however, the single helical reduction gear pinion 3 is replaced by a double helical reduction gear pinion 3a, the single helical gear wheels 4, 5 are replaced by double helical gear wheels 4a, 5a respectively, and the single helical reduction pinions 14, 15 are replaced by double helical reduction pinions 14a, 15a respectively.

More importantly, in the FIG. 3 construction the subsidiary clutch 21, which has the straight clutch teeth, instead of being mounted on the side of the gear wheel 5a remote from the reduction pinion 15a, as in the construction of FIGS. 1 and 2, is disposed on the same side of the gear wheel 5a as the reduction pinion 15a. That is to say, the subsidiary clutch 21 is disposed between the gear wheel 5a and the reduction pinion 15a. In consequence the axial length of the quill shaft 12 is less than that of the quill shaft 10, with the result that the torsional stiffness of the main power path 6 is substantially less than that of the subsidiary power path 7.

If desired, the quill shaft 10, in addition to having an axial length greater than that of the quill shaft 12, could also have a smaller diameter than the latter.

I claim:

1. A power transmission system comprising a synchronous main toothed clutch and at least one subsidiary toothed clutch, said main and subsidiary clutches being arranged in parallel in main and subsidiary power paths respectively between an input shaft of the system and an output shaft of the system, actuating means controlled by the main clutch for effecting inter-engagement with clearance of the co-acting clutch teeth of the subsidiary clutch, said actuating means being rendered operative after engagement of the main clutch has commenced, the main power path having a torsional stiffness which is substantially less than that of the subsidiary power path over at least an initial part of the range of torque loading between zero and full power, such that at a pre-determined power the main power path and the subsidiary power path transmits substantially the same load.

2. A power transmission system as claimed in claim 1 in which the torsional stiffness of the main power path is substantially less than that of the subsidiary power path at all torque loadings below full power.

3. A power transmission system as claimed in claim 1 in which the torsional stiffness of the main power path is substantially less than that of the subsidiary power path during the said initial part only of the said range, the torsional stiffness of the main power path and of the subsidiary power path being substantially equal throughout the remaining part of the said range.

4. A power transmission system as claimed in claim 1 in which each said power path comprises a quill shaft, the quill shaft of the main power path having a diameter less than that of the quill shaft of the subsidiary power path.

5. A power transmission system as claimed in claim 1 in which each said power path comprises a quill shaft, the quill shaft of the main power path having an axial length greater than that of the quill shaft of the subsidiary power path.

6. A power transmission system as claimed in claim 1 in which the main clutch is a synchronous self-shifting clutch.

7. A power transmission system as claimed in claim 6 in which said actuating means are arranged to cause engagement of said subsidiary clutch as soon as full engagement of said main clutch occurs.

8. A power transmission system as claimed in claim 6 in which the main clutch comprises a servo-operated locking means which is movable into and out of a locking position in which it maintains the main clutch in an engaged condition.

9. A power transmission system as claim in claim 8 in which the subsidiary clutch is provided with a servo mechanism which causes the subsidiary clutch to engage whenever the said locking means is moved towards or into the locking position.

* * * * *